United States Patent [19]

Madgavkar et al.

[11] 4,363,361

[45] Dec. 14, 1982

[54] SUBSTOICHIOMETRIC COMBUSTION OF LOW HEATING VALUE GASES

[75] Inventors: Ajay M. Madgavkar, Irvine, Calif.; Roger F. Vogel, Jefferson Township, Butler County, Pa.

[73] Assignee: Gulf Research & Development Company, Pittsburgh, Pa.

[21] Appl. No.: 245,529

[22] Filed: Mar. 19, 1981

[51] Int. Cl.$^3$ .................... B01D 53/34; E21B 43/243; E21B 43/34

[52] U.S. Cl. ................................... 166/256; 166/266; 423/247; 423/245

[58] Field of Search ....................... 166/256, 266, 267; 423/245 S, 247

[56] References Cited

U.S. PATENT DOCUMENTS

| | | | |
|---|---|---|---|
| 3,548,938 | 12/1970 | Parker | 166/256 |
| 3,897,367 | 7/1975 | Lauder | 423/213.5 X |
| 4,009,242 | 2/1977 | Lauder et al. | 423/245 S X |
| 4,186,801 | 2/1980 | Madgavkar et al. | 166/256 |
| 4,191,733 | 3/1980 | Swift et al. | 423/245 S |
| 4,250,962 | 2/1981 | Madgavkar et al. | 166/256 |
| 4,273,188 | 6/1981 | Vogel et al. | 166/256 |

*Primary Examiner*—Stephen J. Novosad
*Assistant Examiner*—George A. Suchfield
*Attorney, Agent, or Firm*—Deane E. Keith; Forrest D. Stine; Donald L. Rose

[57] ABSTRACT

The combustible component of a gas stream of low heating value is combusted using less than a stoichiometric amount of oxygen with minor production of carbon monoxide due to the use of an oxygenation catalyst comprising at least three metals in a perovskite-type crystal structure. This combusted gas can be directly vented to the atmosphere after energy has been extracted from it for a useful purpose.

8 Claims, No Drawings

SUBSTOICHIOMETRIC COMBUSTION OF LOW HEATING VALUE GASES

SUMMARY OF THE INVENTION

This invention relates to the catalyzed combustion of combustible gases of low heat content using less than a stoichiometric amount of oxygen. More particularly, this invention relates to the substoichiometric combustion of low heating value gases under catalytic conditions that substantially minimize the amount of carbon monoxide in the product gas. In this process the low heating value gas is combusted in the presence of a supported perovskite-type oxidation catalyst containing at least three catalyst metal components.

DETAILED DESCRIPTION OF THE INVENTION

Low heating value gas streams, such as waste gas streams and by-product gas streams, have traditionally been discharged to the atmosphere. In recent years a greater knowledge and concern about atmospheric pollution has led to legal standards controlling the direct emission to the atmosphere of gases containing significant amounts of hydrocarbons and/or carbon monoxide. In order to avoid atmospheric pollution, the hydrocarbons and carbon monoxide in a waste gas stream of low heating value are completely combusted with a stoichiometric excess of oxygen for direct venting to the atmosphere. However, in recognition of the fact that a large amount of energy is contained in a large volume of low heating value gas, it has been suggested that the energy loss be reduced by recovering heat energy from the fully combusted gas in a boiler or in a turbine before venting the combusted gas to the atmosphere. In addition to waste and by-product gases, low heating value gases can be intentionally produced for combustion and energy recovery such as in the underground partial combustion and gasification of difficult-to-mine coal deposits.

In contrast with complete combustion of a low heating value gas, catalytically combusting a dilute gas stream of low heating value with an insufficient, that is a substoichiometric, amount of air cannot result in a complete elimination of the combustible components. The utilization of substoichiometric combustion of a low heating value gas may be desirable in certain circumstances, such as, for example, when the composition of the gas and therefore its heat content varies with time. The use of a constant substoichiometric amount of air for combustion results in a constant temperature in both the combustion zone and in the exiting combusted gas notwithstanding the variation in the heat content of the low heating value gas. The constant temperature in the combustion zone avoids catalyst damaging cycles of thermally induced expansion and contraction, which can be a significant problem, particularly when large catalyst structures are required to handle very large volumes of low heating value gas. Furthermore, this combusted gas of constant temperature can be used to drive a gas turbine, without expansion-contraction damage to the turbine blades, which protection is necessary, in particular, with gas turbines which are designed for constant temperature operation. However, the production of substantial quantities of carbon monoxide is a significant problem in the substoichiometric combustion of low heating value, hydrocarbon-containing gas streams using a conventional platinum oxidation catalyst.

U.S. Pat. No. 4,191,733 describes the substoichiometric combustion of hydrocarbon-containing, low heating value gas streams. In this patent the amount of carbon monoxide in the product gas is significantly reduced by using a bimetallic oxidation catalyst containing platinum as one of the catalyst metals. The patent sets out a number of cocatalyst metals, including cobalt, for use in conjunction with platinum and shows a significant decrease in the carbon monoxide content of the combusted gas by the use of the various bimetallic catalysts when compared with a monometallic platinum catalyst.

We have surprisingly discovered that a hydrocarbon-containing, low heating value gas can be combusted in a substoichiometric combustion process to obtain a substantially greater decrease in the amount of carbon monoxide in the product gas than is obtained with the process described in U.S. Pat. No. 4,191,733. We obtain this exceptional decrease in carbon monoxide production by carrying out the substoichiometric combustion process in the presence of a perovskite-type catalyst containing at least three metals. When the perovskite-like catalyst contains platinum and cobalt, the substoichiometric combustion results in a decrease of carbon monoxide to a level which is as much as an order of magnitude or greater below that obtained with a catalyst containing platinum and cobalt, as set out in the above-mentioned patent.

When the combustible component in a low heating value gas comprising methane and one or a mixture of hydrogen, carbon monoxide and higher aliphatic hydrocarbons is partially combusted in a catalytic combustion procedure using less oxygen than that required to convert all combustibles to carbon dioxide and water, the hydrogen, carbon monoxide and the aliphatic hydrocarbons higher than methane tend to be preferentially combusted before methane. Since methane is not regarded as a pollutant when discharged into the atmosphere in moderate quantities, it is desirable to decrease the carbon monoxide and higher aliphatic hydrocarbon content of the partially combusted gas stream relative to the methane content so that the partially combusted gas stream, containing methane as its primary combustible component, can be directly vented to the atmosphere.

In substoichiometric combustion, carbon monoxide may result from one or more reaction mechanisms such as the partial oxidation of the hydrocarbon, the reverse water gas shift reaction $CO_2 + H_2 \rightleftarrows CO + H_2O$, or the steam reforming reaction $CH_4 + H_2O \rightleftarrows CO + 3H_2$. We believe that the catalyst may function in the instant invention by inducing a favorable shift in one or more of these reactions in a direction away from carbon monoxide. Our data does not establish the reaction mechanism but it does show that the partially combusted product gas stream is lower in carbon monoxide and higher in carbon dioxide than gas streams resulting from partial combustion in prior art processes at equivalent hydrocarbon conversion.

In order to effect this preferential elimination of carbon monoxide and produce a partially combusted gas stream in which methane predominates in the combustible component, we utilize low heating value gas streams in our combustion process which initially contain some methane, preferably a significant quantity of methane. For this reason the low heating value gas streams which are substoichiometrically combusted by our process will broadly have at least about 0.5 mol percent, preferably at least about 5 mol percent and most preferably at least about 10 mol percent methane in the combustible component. Although the combustible component can be all methane, the low heating value waste gas or synthesized gas streams which are especially adapted to our combustion process will contain a maximum of about 80 mol percent, and more generally a maximum of about 50 mol percent methane in the combustible component.

The combustible component can also broadly contain up to about 75 mol percent carbon monoxide, up to about 50 mol percent hydrogen and up to about 50 mol percent aliphatic hydrocarbons having from two to about seven carbon atoms. More generally the amount of carbon monoxide in the combustible component is between about 15 and about 50 mol percent, the amount of hydrogen between about 10 and 30 mol percent and the amount of the lower aliphatic hydrocarbons being up to about 25 mol percent. The non-combustible component of the low heating value gas will generally be nitrogen, carbon dioxide or a mixture of these two gases, and it may frequently contain water vapor.

The catalyst which we use in our process has the perovskite-type crystal structure and is defined by the empirical formula $ABO_3$ in which the total number of the A site cations substantially equals the total number of the B site cations and the combined charge of the A and B cations substantially equals the charge on the oxygen atoms. In this catalyst the A sites are populated by one or more cations selected from Group IIA and the lanthanides. The useful Group IIA metals are magnesium, calcium, strontium and barium. The lanthanides have atomic numbers from 57 to 71 with the preferred lanthanides being lanthanum and cerium because of their availability and relatively moderate cost.

The B sites are occupied by at least two metal cations. From about one to about 20 percent, preferably from about one to about ten percent, of the B cation sites are occupied by at least one platinum group metal, preferably platinum itself. The other useful platinum group metals are ruthenium, osmium, rhodium, iridium and palladium. From about 80 to about 99 percent, preferably from about 90 to about 99 percent, of the B cation sites are occupied by at least one non-platinum group metal having an ionic radius between about 0.4 and about 1.4 Angstroms, preferably between about 0.4 and about 1.0 Angstroms. The preferred non-platinum metal is one or more iron group metals selected from iron, cobalt and nickel in one or more of their valence states.

The useful non-platinum metals also include monovalent metals such as magnesium, calcium, strontium, barium, zinc, cadmium, aluminum, gallium, indium, thallium, lanthanum, yttrium and neodymium, zirconium, hafnium, thorium, germanium and tin. The non-platinum group metals additionally include polyvalent metals such as scandium, samarium, ytterbium, lead, chromium, manganese, cerium, titanium, praseodymium in any of their valence states and polyvalent metals such as copper, vanadium, bismuth, niobium, molybdenum, rhenium and uranium, provided that they are in a valence state of 2, 3 and/or 4.

The non-platinum group metals can be present in more than one valence but all of the valence states must be 2, 3 or 4 in order that the combined charges of the A and B cations equal the charge on the oxygen atoms. If the non-platinum metal is present in a valence state other than 2, 3 or 4, the resulting composition will deviate from the perovskite-type structure, which structure is essential for the instant invention. Therefore, the polyvalent non-platinum metals having one or more valence states other than 2, 3 or 4 are, in general, the least desirable for use in the catalyst of the present process, since the valence of the metal might change from a desired valence to an undesired valence during catalyst preparation.

In the ideal perovskite structure, the cations are of appropriate relative sizes and coordination properties and are in a cubic crystalline form in which the larger A site cations occupy the corners of the unit cubes and the smaller B site cations occupy the centers of the cubes. The faces of the cubes are occupied by oxygen atoms. The expression perovskite-like or perovskite-type includes strained or distorted cubic crystal structures which result from variations in the sizes of the metal ions as well as variations in the valence of the metal ions. It is possible that the catalyst may only contain a portion of the cations in the desired perovskite-type structure due to the specific combination of cations, the method of preparing the catalyst or for some other reason. Although this partial perovskite-type catalyst can provide a significant portion of the desired benefits, it is most desirable that a substantial portion or all of the catalyst be in the desired perovskite-type crystal structure.

We find that the present process is suitable for combustion of low heating value gas streams having a heating value as low as about 15 Btu/scf (one British thermal unit per standard cubic foot at atmospheric pressure and 60° F., 15.6° C., equals 9.25 kilocalories per cubic meter) but we prefer that the heating value of the gas stream be at least about 30 Btu/scf. The maximum heating value of the gas stream undergoing combustion by our process broadly is about 200, more generally a maximum of about 150, and most likely contains a maximum of about 100 Btu/scf. Frequently the heating value of the gas fluctuates with time as measured in minutes, hours, days or longer. In the case of gas streams of fluctuating heating value, the heating value specified above means the average heating value over one or more cycles of fluctuation.

There are many types and sources of low heating value gases which can advantageously be combusted by our process, including those low heating value gases which are waste gases as well as those low heating value gases which are intentionally produced. Thus, low heating value gas streams predominating in hydrocarbon combustibles are produced as the liquids-free by-product flue gas obtained from the subterranean in situ combustion processes for the recovery of hydrocarbons from carbonaceous deposits such as petroleum reservoirs, tar sands, oil shale formations, and the like. Or a low heating value gas stream can itself be produced as the primary product such as the low heating value gas stream resulting from the underground combustion of difficult-to-mine coal deposits. The low heating value gas stream can also be either intentionally produced in a factory operation or it can be a factory waste gas stream including synthesis and producer gas; blast furnace gas; waste gases resulting from phosphorus furnaces; from plants manufacturing acetylene gas and from various metallurgical and chemical manufacturing; gas streams involved in the evaporation of hydrocarbon solvents; and the like.

In view of the great variety of sources, the low heating value gas may contain hydrocarbons as its primary combustible component such as those gas streams resulting from the in situ combustion of petroleum reservoirs, tar sands or oil shale formations. Alternatively, the primary combustible component can be carbon monoxide and hydrogen which is the case with synthesis gas and the gas streams resulting from underground coal gasification. Or both hydrogen and hydrocarbons or these two plus carbon monoxide can be present in significant amounts. In general, the present process is directed to those low heating value gas streams containing a significant proportion of their fuel value as either hydrocarbons, carbon monoxide or both.

The hydrocarbon fraction present in these streams can have individual hydrocarbons with up to about seven carbon atoms in their molecule with methane generally being the predominant hydrocarbon. When a mixture of dilute gaseous hydrocarbons is burned in a deficiency of air, the higher hydrocarbons burn most readily while the lower the number of carbon atoms in the molecule the more resistant to combustion is the hydrocarbon. As a result methane is the primary unburned component in a partially combusted mixture of gaseous hydrocarbons. This is fortuitous since methane is not regarded as a pollutant when discharged into the atmosphere in moderate amounts.

Since hydrogen sulfide will form sulfur dioxide as a combustion product, which is controlled as a pollutant, its significant presence in the waste gas is undesired. Additionally, the presence of hydrogen sulfide can affect the catalyzed combustion reaction in several respects such as by inducing a lowering in the overall conversion of any hydrocarbons which are present and by causing an increase in the temperature required for the maintenance of continuous combustion. For these reasons, the amount of hydrogen sulfide in the waste gas stream undergoing substoichiometric combustion is desirably no more than about two weight percent and preferably a maximum of about 0.5 weight percent.

As used herein, air equivalence ratio, or A.E.R., is the ratio of the amount of air used in the partial combustion to the amount of air required at the same conditions of pressure and temperature for stoichiometric combustion of all combustible components in the gas stream (the denominator of this ratio being 1.0 is not expressed). In the substoichiometric combustion of these various low heating value gas streams, the air equivalence ratio will be at least about 0.20 and preferably at least about 0.35 with a maximum of about 0.95 and preferably a maximum of about 0.85. When the heating value of the gas fluctuates with time, the A.E.R. is based on the average heating value of the gas and in this instance it can be referred to as the overall or average A.E.R.

In combusting this low heating value gas and air mixture, it must be heated to its combustion, or light-off temperature, which depends on the particular composition of the gas, and on the particular oxidation catalyst, prior to contacting the gas stream and the oxidation catalyst. After the combustion has been initiated and the combustion chamber and catalyst have been heated up, steady-state combustion can be continued at a temperature significantly lower than the light-off temperature. The preferred means of preheating the gas stream, either together with or in the absence of the air for combustion, is by heat exchange with the hot combusted gas stream. In a two-stage combustion process the waste gas stream is preferably preheated by exchange with the combusted gas exiting from the first stage.

The temperature of the combusted gas stream available for preheating is dependent on a number of factors including the heating value of the gas stream undergoing combustion, the amount of air that is used for combustion and the temperature to which the feed gas stream is preheated. The temperature to which the gas is preheated is not critical other than it be sufficiently high to support combustion under the particular conditions involved. The pressure present in the combustion zone also is not critical, varying from about atmospheric up to about 2,000 psi, more generally up to about 500 psi.

The oxidation catalyst that is used in our substoichiometric combustion process is desirably carried on an inert support. Since the catalytic combustion inherently involves a relatively large volume of the stream of low heating value gas, the support is preferably of a design to permit good solid-gas contact at relatively low pressure drop. A suitable support can be formed as a monolith with hexagonal cells in a honeycomb design. Other cellular, relatively open-celled designs or similar structures having a relatively high void volume are also suitable. It is also possible to use a catalyst bed comprising spheres, extrudates or similar shapes as the catalyst support provided that the pressure drop across the catalyst bed is not too large.

The support for the catalysts to be used in the process of this invention can be any of the refractory oxide supports well known in the art, such as those prepared from alumina, silica, magnesia, thoria, titania, zirconia, silica-aluminas, silica-zirconias, magnesia-aluminas, and the like. Other suitable supports include the naturally occurring clays, such as diatomaceous earth. Additional desirable supports for use herein are the more recently developed corrugated ceramic materials made, for example, from alumina, silica, magnesia, and the like. An example of such material is described in U.S. Pat. No. 3,255,027 and is sold by E. I. duPont de Nemours & Company as "Torvex". More recently metallic monoliths have been fabricated as catalyst supports and these may be used to mount the catalytic material. An example of these supports is Fecralloy manufactured by Matthey Bishop, Inc. under U.S. Pat. Nos. 3,298,826 and 3,920,583.

The catalyst components can be incorporated on the support by any suitable conventional technique used in making supported catalysts. Thus, a solution of soluble compounds can be used to impregnate the support which is then dried and calcined at a suitable temperature for sufficient time to form the desired catalyst structure. But we prefer a procedure by which the catalyst composition having the perovskite-type crystal structure is prepared prior to its application to the support. In this procedure, an anhydrous stoichiometric combination of the catalyst metals, or suitable compounds of the metals such as the oxides, hydroxides, carbonates, nitrates, sulfates, and the like are thoroughly mixed in a finely powdered form and heated in air to an elevated temperature, generally 1,000° C. or above, for several hours to several days until the desired perovskite-type crystal structure is obtained. This preformed, powdered catalytic material and a dispersant-binder, such as alpha alumina monohydrate, are slurried in water and the resulting slurry is applied to the support material. The coated products are heated to dry them and then heated at an elevated temperature to remove water of hydration from the binder and convert it to alumina. The resulting support catalyst structure broadly will contain from about one to about 30 weight percent, but more generally it will contain from about 2.5 to about 20 percent of the perovskite-type material.

DESCRIPTION OF PREFERRED EMBODIMENTS

The reactor used in the following experiments at atmospheric pressure was a one-inch I.D. forged steel unit which was heavily insulated to give adiabatic reaction conditions. The reactor used in the combustion under pressure was made from Incoloy 800 alloy (32 percent Ni, 46 percent Fe and 20.5 percent Cr) but was otherwise the same. Well insulated preheaters were used to heat the gas stream before it was introduced into the reactor. The temperatures were measured directly before and after the catalyst bed to provide the inlet and outlet temperatures. An appropriate flow of preheated nitrogen and air was passed over the catalyst until the desired feed temperature was obtained.

Preheated hydrocarbon was then introduced at a gas hourly space velocity of 42,000 per hour on an air-free basis and combustion was allowed to proceed until steady state conditions were reached. The feed gas stream contained 94.5 mol percent nitrogen, 3.75 mol percent methane, 0.98 mol percent ethane, 0.77 mol percent propane and 400 ppm. hydrogen sulfide, except where otherwise noted. The heating value of this feed stream is about 75 Btu/scf. The experiments were conducted at atmospheric pressure or at an elevated pressure as noted. The analyses were made on a water-free basis after steady state conditions were reached. The conversion is the overall conversion of all hydrocarbon constituents. No measurable free oxygen occurred in the product gas stream.

EXAMPLES 1-5

A perovskite-type catalyst having the nominal composition, $La_{0.6}Sr_{0.4}Pt_{0.1}Co_{0.9}O_3$ was used in these examples. This catalyst material was coated on a "Torvex" alumina ceramic honeycomb material in the form of cylinders one inch in diameter with a length of one inch. Three of these catalyst pieces were positioned in the reactor with the axes of the cells being parallel to the axis of the reactor. The catalyst comprised 76 percent support, 20 percent of the perovskite catalyst and four percent of an alumina binder.

A series of five combustion experiments was carried out on the low heating value gas stream using the perovskite oxidation catalyst at different operating pressures and/or air equivalence ratios. The results of the combustion tests are set out in the following table. Also included in the Table are the data for three oxidation runs copied from U.S. Pat. No. 4,191,733 for comparison purposes. Since the patent runs were carried out on the same gas in the same equipment and at the same conditions, the Table sets out a true comparison of the effects of the different oxidation catalysts. These three patent runs are identified in the following Table by the same run number as found in the patent. The pressure in Examples 1-3 was 75 psig.

TABLE

| Example | A.E.R. | Inlet Temp. °F. | Outlet Temp. °F. | CO mol % | $CO_2$ mol % | $CO_2$/CO | Conversion % |
|---|---|---|---|---|---|---|---|
| 1 | 0.4 | 650 | 1173 | 0.13 | 2.45 | 18.8 | 33.0 |
| 2 | 0.6 | 650 | 1329 | 0.07 | 3.31 | 47.3 | 53.2 |
| 3 | 0.8 | 650 | 1473 | 0.11 | 3.88 | 35.2 | 72.7 |
| 4 | 0.6 | 650 | 1629 | 0.10 | 3.22 | 32.2 | 50.0 |
| 5 | 0.8 | 850 | 1869 | 0.14 | 3.55 | 25.4 | 63.6 |
| Run 5[a] | 0.6 | 650 | 1315 | 2.42 | 1.79 | 0.74 | 71.4 |
| Run 15[b] | 0.6 | 650 | 1285 | 2.85 | 1.59 | 0.56 | 76.3 |
| Run 33[c] | 0.7 | 650 | 1625 | 0.85 | 3.09 | 3.64 | 72.0 |

[a] catalyst contained about 0.3% platinum metal
[b] catalyst contained about 0.5% platinum metal
[c] catalyst contained about 0.3% platinum metal and about 1.0% cobalt oxide, CoO The efficacy of the various catalysts in reducing the carbon monoxide content in the product gas stream can be evaluated from a study of both the carbon monoxide analyses as well as the carbon dioxide to carbon monoxide mol ratios as set out in the preceding table. Of particular interest is a comparison of the data at the same overall conversion of the hydrocarbon constituents in the low-heating value gas, namely, Example 3 and Runs 5 and 33. Thus, it is noted that at the same conversion the carbon dioxide to carbon monoxide ratio in the prior art monometallic platinum catalyst is 0.74 and with the prior art bimetallic cobalt-platinum catalyst it is 3.64, while with the instant perovskite-type catalyst the ratio is 35.2.

The information obtained from these experiments is utilized in an integrated tertiary oil recovery operation by in situ combustion according to the following example.

EXAMPLE 6

An in situ fire flood is initiated in an oil zone in an underground petroleum reservoir at an overall depth of about 6,000 feet. Oil production from the formation had been exhausted following secondary recovery by water injection. The fire is initiated in the formation and steady state conditions are reached in about 10 weeks. At this time about 9.1 million scf per day of air at a temperature of about 200° F. and a pressure of about 3,800 psi are pumped into the injection well by a multistage compressor, which is driven by a gas turbine. The combusted gas and entrained hydrocarbon liquids are produced in adjacent production wells. The entrained liquids are removed in a separator resulting in about 7.5 million scf per day of liquid-free, waste flue gas of low heat content. The temperature of this flue gas is about 95° F. and its pressure is about 150 psig. Its average analysis over a 19-day period is about 2.2 percent methane, about 0.5 percent ethane, about 0.4 percent propane, about 0.3 percent butane, about 0.25 percent pentanes, about 0.2 percent hexanes and higher, about 500 ppm sulfur, about 15 percent carbon dioxide, about one percent argon and the remainder nitrogen. Its average heat content for this 19-day period is about 78 Btu/scf with a maximum value of about 91 and a minimum value of about 61 during this period.

This flue gas is combusted in two stages. The catalyst in the first stage is a perovskite oxidation catalyst having the nominal composition $La_{0.6}Sr_{0.4}Pt_{0.1}Co_{0.9}O_3$ supported on a Torvex monolithic ceramic support. The composition of the catalyst is about 6.98 weight percent lanthanum, about 2.93 percent strontium, about 1.63 percent platinum and about 4.44 percent cobalt. The catalyst in the second stage is a monometallic platinum oxidation catalyst comprising about 0.3 percent platinum on the same support as used in the first stage. Over this 19-day period under study the flue gas is combusted by the injection of a constant amount of air, approximately equally divided between the input to each combustion stage, to provide an average air equivalence ratio of about 0.64. As a result the combustion is substoichiometric over the entire 19-day period. The flue gas-air mixture is heated above its ignition temperature by heat exchange with the combusted gas from the first stage before it is introduced into the first combustor. The combusted flue gas is mixed with the second portion of combustion air after the heat exchanger and prior to entering the second combustor. The gas stream leaving the second combustor has a temperature of about 1,550° F. This hot gas stream is used to drive the gas turbine which is designed for an operating temperature of 1,450° F. Therefore, a sufficient quantity of the 200° F. compressed air is bled from the compressed air line and injected into the combusted flue gas prior to the turbine inlet to drop its temperature to about 1,450° F. The combusted flue gas is introduced into the turbine at a pressure of about 90 psia and exits at near atmospheric pressure. Since the first combustor uses the perovskite catalyst, the turbine exhaust contains less than 0.5 percent carbon monoxide permitting it to be vented directly to the atmosphere.

As stated, the heating value of the low heating value gas that is to be combusted by our process may vary with time. In the combustion of such a gas of varying heating value with a constant stream of combustion air for the purpose of driving a gas turbine, it is preferred that the air equivalence ratio be so selected that there is not a substantial excess of oxygen at any specific period of operation, i.e., at a period of low heating value, in order to ensure that during this period there is not a substantial drop in temperature of the combusted gas that is fed to the turbine. If the variations in heating value over a period of time exhibit a substantial swing between the minimum and maximum values, it may be expedient to inject supplemental fuel into the feed gas stream during minimum values to decrease the extent of the negative swing rather than use an average A.E.R. that is too low for efficient utilization of the heat energy in the low heating value gas.

In using the low heating value gas to drive a gas turbine, the combusted gas must enter the gas turbine at a sufficient pressure for satisfactory operation of the gas turbine. In general, an inlet pressure of at least about 75 psi or higher is desirable. This pressure can be obtained, if necessary, by compressing the gas fed to the combustion furnace. A gas turbine can be operated at a temperature as low as about 1,000° F. or even lower, but since turbine efficiency exhibits a significant drop at the lower temperatures, it is preferred to operate at a temperature at which significant efficiency is obtained, and particularly a temperature of at least about 1,200° F. The maximum temperature is determined by the temperature resistance of the materials from which the turbine is constructed and can be about 2,000° F. or even higher particularly if the compressor is designed with provision for auxiliary cooling but it is preferred that the maximum operating temperature be about 1,800° F. Generally, a large capacity turbine of the type which would be used with large gas volumes is designed for optimum operation within a specific restricted temperature range.

The above example illustrates a two-stage combustion procedure utilizing a perovskite oxidation catalyst in the first stage and a platinum oxidation catalyst in the second stage. The catalyst in the second stage can also be the same or a different perovskite oxidation catalyst or it can be a bimetallic or multi-metallic oxidation catalyst as described in U.S. Pat. No. 4,191,733. A further variation is a platinum oxidation catalyst or a bimetallic catalyst as described in the patent in the first stage and a perovskite catalyst in the second stage. For the benefits to be obtained at least one of the catalysts in a multi-stage combustion should be the perovskite catalyst as described herein.

In a two-stage combustion procedure, it is desirable if at least about one-third of the total air which is to be used in the substoichiometric combustion be added in one combustor, and it is generally preferred that about one-half of this combustion air be added in each combustor. This ability to vary the amount of combustion air added to the first combustor permits the temperature of the gas stream entering the first stage reactor, following heat exchange with the combusted gas from the first stage, to be varied. This air that is used for combustion of the gas, as well as any air that may be used for cooling the combusted gas down to the desired turbine operating temperature, needs to have a pressure only moderately higher than the pressure of the gas streams into which it is injected. The turbine may be used to drive an air compressor to provide compressed air for use in a subterranean combustion procedure, for driving an electric power generator or for powering other desired equipment.

Since the gas product resulting from our combustion process contains one or more combustible components but almost no carbon monoxide, the combustible components will comprise one or more hydrocarbons and possibly some hydrogen with methane being the most likely as well as the most preferred combustible component, as explained above. Because methane is the least combustible component in a mixture of hydrogen, carbon monoxide and lower hydrocarbons, the preferred low heating value gas streams to be combusted by our process will contain some methane. However, this is not critically necessary, since some non-combusted methane in the product gas may be produced by the reverse steam reforming reaction and by the cracking of higher hydrocarbons. Additionally, in the absence of methane or with a small amount of methane in the feed gas some of the non-combusted material in the product gas stream may comprise hydrocarbons higher than methane as well as uncombusted hydrogen or hydrogen produced by the water gas shift reaction.

It is to be understood that the above disclosure is by way of specific example and that numerous modifications and variations are available to those of ordinary skill in the art without departing from the true spirit and scope of the invention.

We claim:
1. The in situ combustion process for recovering hydrocarbons from subterranean formations which comprises injecting a stream of combustion air into at least one injection well leading to a combustion zone in said subterranean formation, producing liquid and/or gaseous hydrocarbons and combustion gas from at least one production well, separating any liquid hydrocarbons from the stream of combustion gas whereby a separated stream of flue gas is obtained having a heating value between about 15 Btu/scf and about 200 Btu/scf and containing at least on aliphatic hydrocarbon having from one to about seven carbon atoms, passing said gas stream admixed with air for combustion in contact with an oxidation catalyst in each of one or more combustion zones at a temperature high enough to initiate and main- tain combustion of said gas stream, the total amount of combustion air being sufficient to provide an air equivalence ratio of between about 0.20 and about 0.95,
  at least one of said oxidation catalysts having the perovskite-type $ABO_3$ crystal structure wherein the A sites are substantially fully occupied by one or more metals selected from Group IIA and the lanthanides, the B sites are occupied by (a) about one to about 20 atomic percent of a platinum group metal and (b) about 80 to about 99 atomic percent of one or more non-platinum group metals having an atomic radius between about 0.4 and about 1.4 Angstroms, and the total valence charge of the A and B site metals is equal to the total valence charge of the oxygen present.

2. The process of claim 1 comprising expanding the gas stream in a gas turbine following said catalyzed combustion, and driving an air compressor with said gas turbine to compress and inject said stream of combustion air into the said subterranean combustion zone.

3. A process for the recovery of energy from a gas stream having an average heating value in the range of about 15 to about 200 Btu/scf and having a combustible component comprising up to about 100 mol percent methane, from about 0 to about 75 mol percent carbon monoxide, from about 0 to about 50 mol percent hydrogen and from about 0 to about 50 mol percent aliphatic hydrocarbons having from two to about seven carbon atoms, which comprises the steps
  (a) passing said gas stream admixed with air for combustion in contact with an oxidation catalyst in each of one or more combustion zones, at an overall average air equivalence ratio of between about 0.2 and about 0.95 and at a temperature high enough to initiate and maintain combustion of said gas stream,
  at least one of said oxidation catalysts having the perovskite-type $ABO_3$ crystal structure wherein the A sites are substantially fully occupied by one or more metals selected from Group IIA and the lanthanides, the B sites are occupied by (a) about one to about 20 atomic percent of a platinum group metal and (b) about 80 to about 99 atomic percent of one or more non-platinum group metals having an atomic radius between about 0.4 and about 1.4 Angstroms, and the total valence charge of the A and B site metals is equal to the total valence charge of the oxygen present,
  (b) utilizing the heat energy produced in said gas stream by said combustion and
  (c) discharging the incompletely combusted gas stream into the atmosphere.

4. The process of claims 1 or 3 in which the heating value of the gas stream is between about 30 and about 125 Btu/scf and the air equivalence ratio is between about 0.35 and about 0.85.

5. The process of claims 1 or 3 in which the combustible component of the gas stream comprises between about 5 and about 80 mol percent methane, between about 15 and about 50 mol percent carbon monoxide, between about 10 and about 30 mol percent hydrogen and from about 0 to about 25 mol percent aliphatic hydrocarbons having from two to about seven carbon atoms.

6. The process of claims 1 or 3 in which the combustible component comprises between about 10 and about 50 mol percent methane.

7. The process of claims 1 or 3 in which the platinum group metal is platinum and the non-platinum group metal is selected from nickel, cobalt and iron.

8. The process of claim 7 in which the A site contains strontium and lanthanum.

* * * * *